(12) United States Patent
Murphy et al.

(10) Patent No.: US 7,391,312 B2
(45) Date of Patent: Jun. 24, 2008

(54) METHOD AND SYSTEM FOR AN INCIDENTAL FEEDBACK PLATFORM

(75) Inventors: Shawn M. Murphy, Seattle, WA (US); Gabriel J. Aul, Shoreline, WA (US); Hany Farag, Redmond, WA (US); Kinshuman Kinshuman, Bellevue, WA (US); Corneliu I. Lupu, Sammamish, WA (US); Gregory W. Nichols, Bellevue, WA (US); Andre F. Vachon, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 211 days.

(21) Appl. No.: 11/112,208

(22) Filed: Apr. 22, 2005

(65) Prior Publication Data

US 2006/0271591 A1    Nov. 30, 2006

(51) Int. Cl.
  *G08B 23/00* (2006.01)
(52) U.S. Cl. .............................. 340/500; 714/2; 714/15; 714/38
(58) Field of Classification Search ................. 340/500; 707/202; 714/2, 10, 11, 15, 37, 38, 49
See application file for complete search history.

(56) References Cited

U.S. PATENT DOCUMENTS

| | | | |
|---|---|---|---|
| 6,567,928 B1 * | 5/2003 | Lyle et al. ..................... 714/15 |
| 6,629,267 B1 | 9/2003 | Glerum et al. | |
| 6,665,824 B1 | 12/2003 | Ruhlen et al. | |
| 6,675,295 B1 | 1/2004 | Marcelais et al. | |
| 6,708,333 B1 | 3/2004 | Glerum et al. | |
| 6,748,554 B2 * | 6/2004 | Jin et al. ....................... 714/15 |
| 6,785,848 B1 | 8/2004 | Glerum et al. | |
| 6,816,984 B1 * | 11/2004 | Snyder et al. ................. 714/38 |
| 6,845,470 B2 * | 1/2005 | Austen et al. ................. 714/38 |
| 7,051,238 B2 * | 5/2006 | Gardner et al. ................ 714/38 |
| 7,207,047 B2 * | 4/2007 | Subramanian et al. ......... 714/2 |
| 7,219,266 B2 * | 5/2007 | Glerum et al. ................ 714/38 |
| 2004/0107387 A1 | 6/2004 | Larsson et al. | |

* cited by examiner

*Primary Examiner*—John Tweel, Jr.
(74) *Attorney, Agent, or Firm*—Marshall, Gerstein & Borun LLP

(57) ABSTRACT

A vertical can be a series of computer-executable instructions that, in response to an incident, collect information regarding that incident and transmit the information for analysis and possible helpful feedback to the user. A general purpose vertical can address types of incidents, such as crashes or hangs, across a variety of applications, while a custom vertical can be written to address application-specific incidents. Verticals can access underlying support mechanisms through an infrastructure, which can also enable applications to request that additional data be collected by the verticals, and set other preferences. Once the data is collected and transmitted, a vertical may receive feedback, that can be a request for additional information or feedback to the user. The feedback to the user can attempt to identify the incident and aid the user in recovering from it and avoiding it in the future.

20 Claims, 5 Drawing Sheets

METHOD AND SYSTEM FOR AN INCIDENTAL FEEDBACK PLATFORM

FIELD OF THE INVENTION

This invention relates generally to program incident handling and, more particularly, relates to mechanisms for collecting and transmitting information regarding program incidents and providing ameliorating feedback.

BACKGROUND

All too frequently application programs experience incidents which result in the loss of information, forcing users to perform the frustrating and inefficient task of re-entering all of the lost information into the application program. Additional inefficiency is created by the need to restart the application program or even the computing device itself in an attempt to recover from the incident, or to attempt to prevent further incidents. Unfortunately, the vast majority of users are ill equipped to determine why the incident occurred, and are therefore generally powerless to prevent its reoccurrence.

The programmers of the application programs, and others tasked with supporting the programs after their release, are often in a worse position to assess the causes of various incidents because users either cannot adequately describe the circumstances under which those incidents occurred, or do not even bother to report them. Consequently, many programmers and application support personnel are not even aware of the majority of such incidents and, of those incidents of which they are aware, they do not possess sufficient information upon which to provide useful feedback. Additionally, because many users do not bother to report such incidents, the application support personnel often underestimate the existence of the applications' faults, or receive an insufficient quantity of user reports from which to detect similarities among the incidents and thereby attempt to resolve them.

To address such shortcomings, modern operating systems have recently begun to incorporate a rudimentary incident reporting mechanism by which a small, pre-selected amount of data is saved when an incident occurs, and then subsequently data is transmitted to a central repository which can be accessed by programmers and other support personnel so that they may attempt to ascertain a cause, and provide a solution to prevent further incidents. Unfortunately, such incident reporting mechanisms are often too general to provide useful information regarding the incidents of particular applications. For example, an incident reporting mechanism that detects an application incident where the application stops responding, commonly referred to as a "hang", may collect data from an area of memory that the operating system believes is most relevant. However, the programmers and support personnel of that particular application may not learn anything useful from the saved data, and might have preferred to save a different collection of data, which may have provided more useful information. Of course, the above assumes that the programmers and support personnel of that particular application would even seek to obtain the data collected by the operating system. Generally, such information is reported to the support personnel supporting the operating system, and there may exist inefficiencies of communication between the operating system support personnel and the application support personnel.

Therefore, what is needed is a mechanism by which application developers, programmers and support personnel can specify which information is collected from their applications in the case of particular incidents. In addition, the developers and programmers should be provided with default mechanisms which can collect a minimum of information to record those incidents that may not have been foreseen by the developers and programmers of the application, or which may be the result of an interaction between the applications of two or more different groups of developers and programmers.

BRIEF SUMMARY OF THE INVENTION

Therefore, in one embodiment of the present invention, an interface and support structures are provided by which application program developers and programmers can create their own specialized mechanisms to collect and transmit a predetermined set of data in the event that their application program experiences a predefined incident that is relevant to their application.

In another embodiment of the present invention, existing mechanisms can be provided to collect a predetermined set of data and can utilize the same interface and support structures, but can be directed to more universal incidents that might not be particular to a given application program. Such existing mechanisms can be leveraged by application program developers and programmers without the need to create their own mechanisms, should they choose to do so.

In a further embodiment of the present invention, the information collected after an application incident can be transmitted to one or more locations for additional automated or manual analysis.

In a still further embodiment of the present invention, the predetermined set of data collected after an application incident can be appended to as part of an incident reporting feedback mechanism.

In yet another embodiment of the present invention, existing mechanisms provided to collect a predetermined set of data can be extensible so as to enable application programs to register for the collection of additional sets of data.

In yet another embodiment of the present invention, a user can receive information in response to the transmission of the collected information, which can include instructions or guidelines to avoid or ameliorate the future occurrence of the application incident.

Although the description herein focuses primarily on the collection of information in the event of incidents in the context of application programs, it will be appreciated that the description is equally applicable to incidents in the context of any set or sets of computer-executable instructions, including drivers, plug-ins, modules, libraries and the like. Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Figure 1:
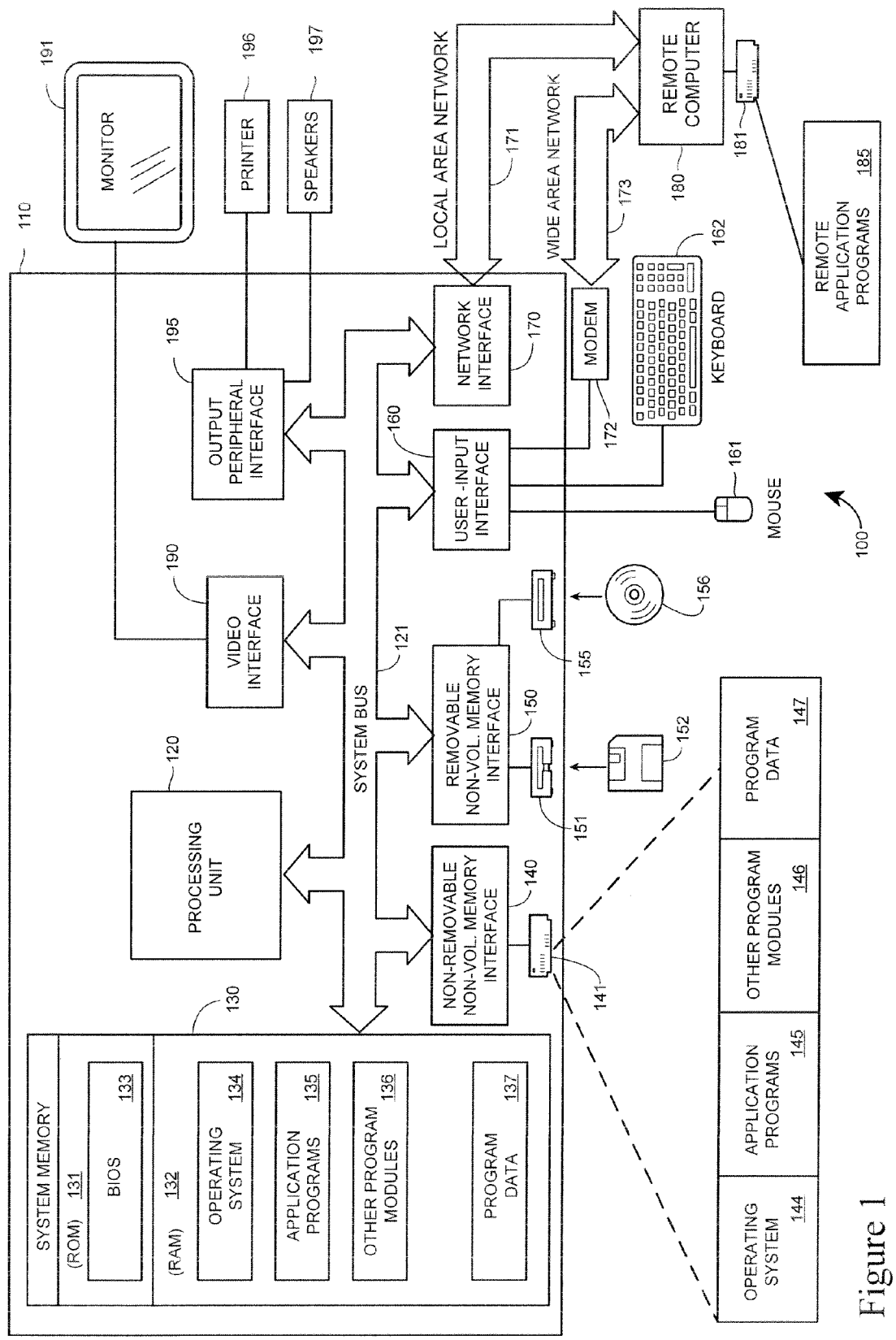
FIG. 1 is a block diagram generally illustrating an exemplary computing device with which embodiments of the present invention can be implemented.

Many application programs can, for reasons that are not immediately evident to the average user, cease to operate in a proper and expected fashion. One such incident can be what is commonly referred to as a "hang", where the application program ceases to respond to user input and appears to no longer be performing any useful computations. Another such incident is commonly referred to as a "crash", and can involve a sudden and unexpected termination of some or all of the application program, and in some instances the termination of some or all of the operating system processes or other application programs' processes. Additionally, applications can also experience incidents unique to the particular application. For example, complex image editing applications can require the execution of one or more components known as "plug-ins". Such plug-ins can themselves be the cause of one or more incidents, which would be unique to those applications that rely on the plug-in.

For more universal incidents, a single component can be provided for detecting that type of incident, irrespective of the suspect application or applications, and in response collecting a predetermined set of data to aid in analyzing the incident. Thus, a single component can detect a crash by any application, and can collect a predetermined set of data about that crash. Similarly, a single component can detect a hang by any application, and can collect a predetermined set of data about that hang. However, for incidents that may be relevant to only a single application, a custom component, using a standard set of interfaces and support structures, can be created to detect those types of incidents and collect a predetermined set of data appropriate for that type of incident. Additionally, both the components directed to universal incidents, and those directed to application-specific incidents are capable of collecting more than the predetermined set of data. The predetermined set of data is a minimum which those components can collect, but additional data points can be collected at the request of the application prior to any incident, as part of any feedback received after the predetermined set of data has been transmitted, or at the request of another process, either during or after the incident.

In the description that follows, the term "vertical" will be used to refer to a component, process, or other collection of executing or non-executing computing instructions whose purpose is to respond to a particular incident or types of incidents by collecting at least a default set of data. Verticals, as will be described in detail below, can use a set of interfaces and other support structures that can be provided by, for example, the operating system, or other lower-level code, to collect the data. Application developers and programmers will also be able to use those interfaces and support structures to request that existing, general purpose verticals, such as a "crash vertical" or a "hang vertical", collect additional data. Alternatively, they could create their own vertical, which can access the interfaces and support structures to collect the sets of data deemed important for the particular incident, or type of incident, to which the custom vertical would be directed to.

Turning to the drawings, wherein like reference numerals refer to like elements, the invention is illustrated as being implemented in a suitable computing environment. Although not required, the invention will be described in the general context of computer-executable instructions, such as program modules, being executed by a personal computing device. Generally, program modules include routines, programs, objects, components, data structures, etc. that perform particular tasks or implement particular abstract data types. Moreover, those skilled in the art will appreciate that the invention may be practiced with other computing configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing device 100 on which the invention may be implemented. The computing device 100 is only one example of a suitable computing device and is not intended to suggest any limitation as to the scope of use or functionality of the invention. Neither should the computing device 100 be interpreted as having any dependency or requirement relating to any one or combination of components illustrated in the exemplary computing device 100.

With reference to FIG. 1, an exemplary system for implementing the invention includes a general purpose computing device 100, which can include, but is not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computing device 100 typically includes a variety of computer readable media, which can include any available media that can be accessed by computing device 100 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computing device 100 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing device 100. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computing device 100 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computing devices may also include other peripheral output devices such as speakers 197 and printer 196, which may be connected through a output peripheral interface 195.

The computing device 100 may operate in a networked environment using logical connections to one or more remote computers, such as a remote computing device 180. The remote computing device 180 may be another personal computer, a server, a router, a network PC, a peer device or other common network node, and typically includes many or all of the elements described above relative to the computing device 100, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computing device 100 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computing device 100, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
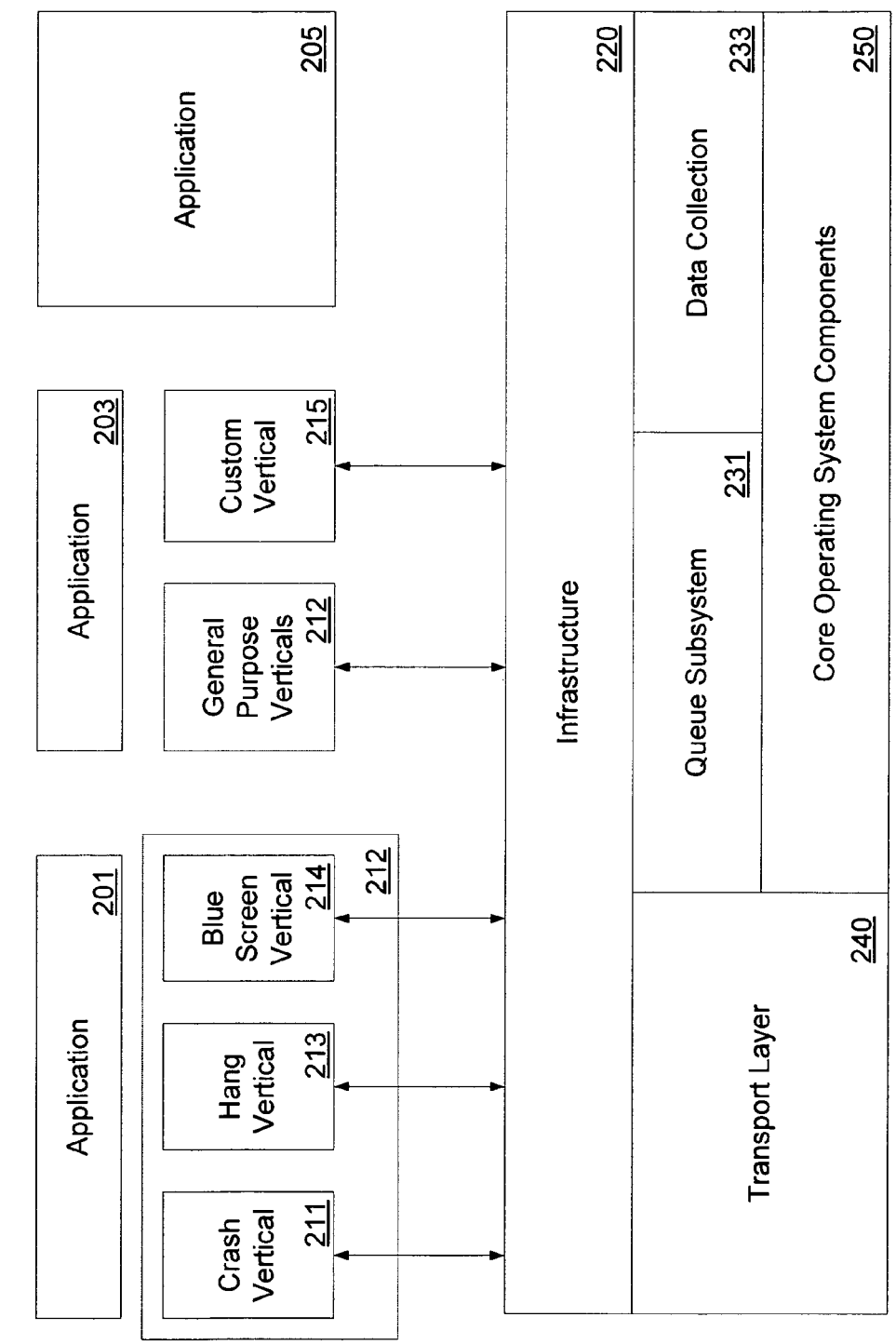
FIG. 2 is a layer diagram generally illustrating elements contemplated by embodiments of the present invention.

Turning to FIG. 2, a layer diagram 200 illustrates the interaction of some of the components contemplated by embodiments of the present invention. As will be known by those skilled in the art, layer diagrams, such as the one illustrated in FIG. 2, are generally oriented such that higher level user mode processes appear at the top of the diagram, while operating system or kernel mode processes appear at the bottom of the diagram. Thus, layer diagram 200 illustrates a series of applications at the top of the diagram, namely applications 201, 203 and 205. As previously described, while embodiments of the present invention are described in the context of application programs, such as applications 201, 203 and 205, they are equally applicable to any type of computer executable code, library, or process, including drivers, plug-ins, system service threads, applets, and the like.

Applications 201, 203 and 205 can take advantage of the abilities of lower level components and services, such as those illustrated in the lower half of layer diagram 200, through one or more verticals, including a Crash Vertical 211, a Hang Vertical 213, a Blue Screen Vertical 214, all collectively referred to as General Purpose Verticals 212, and a Custom Vertical 215. For example, application 201 is illustrated in FIG. 2 as being layered on top of Crash Vertical 211, Hang Vertical 213, and Blue Screen Vertical 214. General purpose verticals, such as the General Purpose Verticals 212 illustrated in FIG. 2, which comprise the Crash Vertical 211, the Hang Vertical 213 or the Blue Screen Vertical 214, can be made available to all applications, such as application 201 or application 203, by default. Consequently, absent specific instructions from an application, all applications will be able to take advantage of general purpose verticals, and application 201 is, therefore, illustrated as being layered on top of them.

The General Purpose Verticals 212, including the Crash Vertical 211, the Hang Vertical 213 and the Blue Screen Vertical 214, can perform their designated functions by invoking one or more infrastructure 220. For example, the infrastructure 220 can provide a convenient mechanism by which the function of the queue subsystem 231 or the data collection mechanisms 233 can be accessed. As will be described in more detail below, the queue subsystem 231 can manage the information that was collected by verticals and enqueued for transmission. In addition, the queue subsystem can also retain records of information that was previously enqueued and subsequently transmitted, and it can interface with the transport layer 240 to ensure that the enqueued information is transmitted properly and in a timely manner. Similarly, the data collection mechanisms 233 can interface with core operating system components 250 to access the information and data requested by verticals and return such information and data to the vertical. The core operating system components 250 can include the operating system registry, memory manager, thread manager, shell, display subsystems, file system and the like, and each such component can receive requests from the data collection mechanisms 233 using known interfaces, and can similarly return the requested information to the data collection mechanisms 233 using those same interfaces.

As indicated above, application 201 can take advantage of General Purpose Verticals 212 and, as such, is illustrated as being layered on top of them. In fact, in one embodiment of the present invention general purpose verticals can operate without explicit instruction from an application, enabling application developers and support personnel to derive benefit from them without modifying their application or explicitly accounting for such general purpose verticals. For example, as will be described in further detail below, if the application 201 were to crash, the core operating system components 250 would detect such a crash and could notify the Crash Vertical 211. The Crash Vertical 211 could then collect information regarding the crash from the application 201 or from the core operating system components 250, such as the registry or memory manager, and then save that information by using the infrastructure 220 to access the data collection mechanisms 233. The Crash Vertical 211 can then request, again via the infrastructure 220, that the queue subsystem 231 transmit the data. If the transport layer 240 already has an active network connection, the queue subsystem 231 can request that the collected data be transmitted. Alternatively, the queue subsystem 231 can enqueue the data for subsequent transmission.

In addition to general purpose verticals, such as the Crash Vertical 211 or the Hang Vertical 213, custom verticals can also be created for an incident that can be experienced by a particular application or class of applications. Such custom verticals would often be created by the developers or programmers of that particular application or class of applications and would be able to specify sets of data to be collected that may be more relevant to the particular incident to which the custom vertical is directed. FIG. 2 illustrates one such custom vertical as custom vertical 215 that is illustrated as being used by application 203. Because custom vertical 215 can be application specific, only application 203 is illustrated as being layered on top of it. This is in contrast to more general purpose verticals, such as Crash Vertical 211 or the Hang Vertical 213, which are illustrated as layered under both application 201 and application 203. A custom vertical, such as custom vertical 215, can utilize the same infrastructure 220 as the General Purpose Verticals 212, as described above. Alternatively, an application, such as application 205, can opt-out of any reliance on general purpose verticals. Thus, as illustrated in FIG. 2, application 205 need not be layered above any verticals.

Rather than creating a custom vertical, such as custom vertical 215, to collect specific sets of data that might be more useful than the default data collected by a general purpose vertical, another alternative, contemplated by embodiments of the present invention, enables an application, such as application 201 or 203, to specify additional data for a vertical to collect. For example, an application can register for data that a general purpose vertical, such as one of the General Purpose Verticals 212, can collect in the event of an incident to which that vertical is addressed. Such additional elements of data can include a larger segment of the application's memory, different locations of the application's memory, various files from the file system, the values of specific registers, other application data maintained by the core operating system components 250, and similar such information.

General purpose verticals, and custom verticals, can also be invoked directly by an application. Such an invocation can also be a mechanism by which the application specifies one or more additional elements of data for the verticals to collect and transmit.

Figure 3:
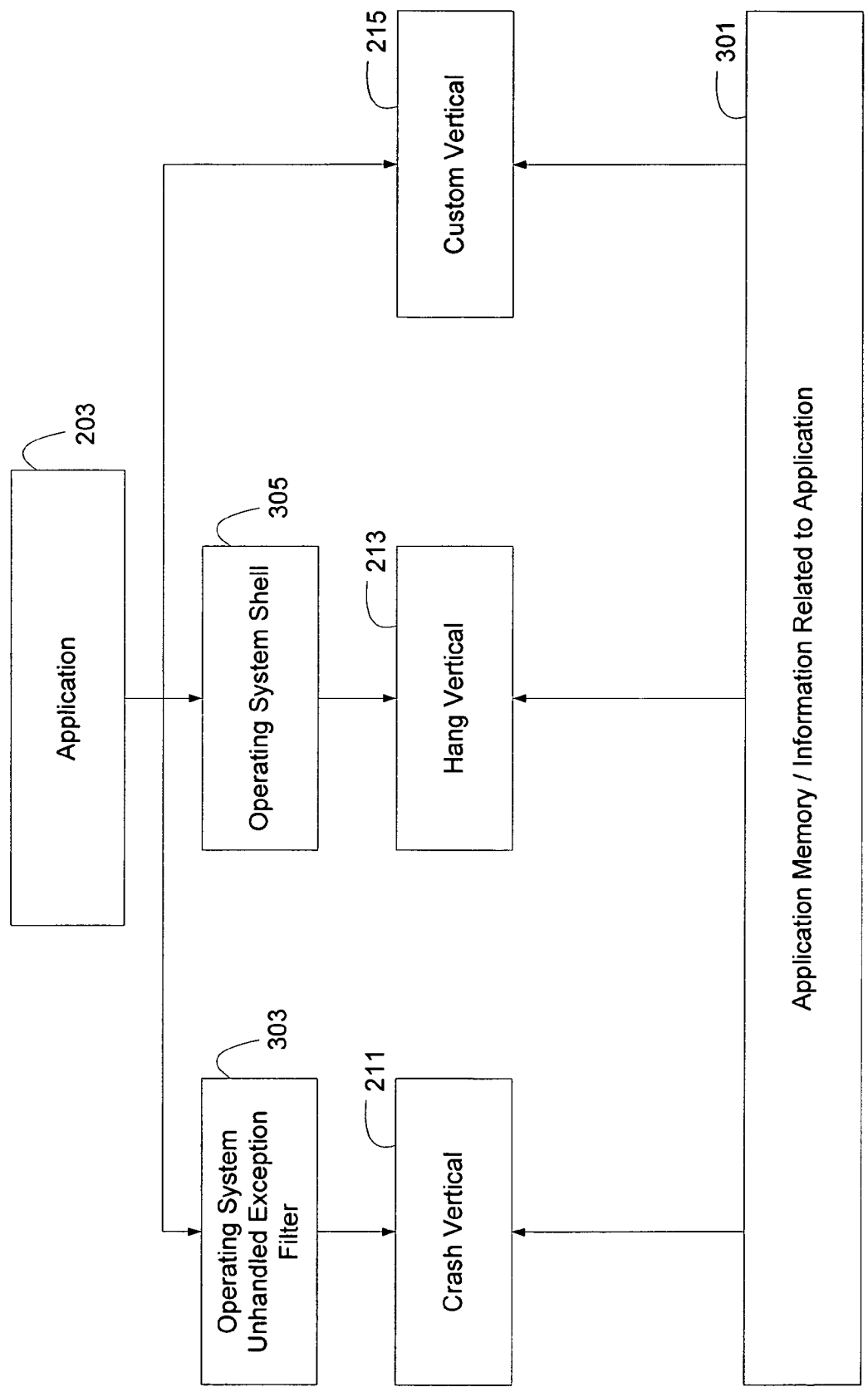
FIG. 3 generally illustrates a layered operational flow contemplated by embodiments of the present invention.

Turning to FIG. 3, a flow of the operation of the Crash Vertical 211, the Hang Vertical 213, and the custom vertical 215 is illustrated in a layered perspective. An application, such as application 203, can be executing as illustrated at the top of FIG. 3. Subsequently, an incident can occur that can either be a "fatal" incident or a "non-fatal" incident. As will be known by those skilled in the art, a "fatal" incident generally refers to an incident which renders the application program no longer capable of operating properly. Fatal incidents can include crashes, hangs, and other similar incidents. A non-fatal incident, on the other hand, can be any improper or unexpected operation on the part of the application program that does not render the program incapable. For example, the failure to load a plug-in properly, display a menu, or update a part of the screen can all be non-fatal incidents.

Because the application can continue operating after a non-fatal incident, the application itself can invoke a vertical. Thus, as illustrated in FIG. 3, the application 203 can call the custom vertical 215, which can then collect information from various information sources generically referred to in FIG. 3 as application memory/information related to application 301. Once collected, the vertical can transmit the information, as illustrated by step 311, for further analysis.

For fatal incidents, however, because the application can be rendered inoperable, external processes can be called upon to detect the incident and invoke an appropriate vertical, which can similarly be a separately executing process. For example, as illustrated in FIG. 3, if the application 203 experiences a crash, such an incident can be detected by the operating system unhandled exception filter 303. The unhandled exception filter, as will be known by those skilled in the art, is a common element of many modern operating systems that is invoked when an application program crashes. If the unhandled exception filter 303 detects that the application 203 has crashed, the filter 303 can invoke the Crash Vertical 211. The Crash Vertical 211 can collect a predetermined set of data from the application memory/information related to application 301.

As a general purpose vertical, the Crash Vertical 211 can collect a default set of data unless the application 203 previously registered for the collection of additional data. The default set of data collected by a general purpose vertical can be selected to balance the need for efficiency with the need to collect a sufficiently broad sample of data such that a wide variety of potential causes can be analyzed. One exemplary set of data collected by a Crash Vertical can comprise: (1) the name of the faulting application, (2) the version of the faulting application, (3) the timestamp when the application was created, (4), the name of the faulting module, (5) the version of the faulting module, (6) the timestamp when the module was created, (7) the offset in bytes where the fault occurred in the module, calculated by obtaining the location of the instruction pointer at the time of the crash and subtracting from it the load address of the module where the crash occurred, and (8) the exception code documenting the type of exception that occurred.

If, instead of crashing, the application 203 instead experienced a hang, the operating system shell 305, or other operating system components could detect the non-responsiveness of the application and could invoke the Hang Vertical 213 in a manner analogous to the invocation of the Crash Vertical 211 described in detail above. The Hang Vertical 213 could then similarly collect a predetermined set of data from the application memory/information related to application 301. As with the Crash Vertical 211, a Hang Vertical 213, being a general purpose vertical, can collect a default set of data, unless the application registered for more, wherein the default set of data is selected to provide as much information as can efficiently be collected and which is likely to aid in identifying the cause of the hang. For example, the Hang Vertical 213 can collect the same, or very similar, set of data as the default set of data collected by the Crash Vertical 211 described in detail above.

Returning to FIG. 2, the infrastructure 220, as can be seen from the above descriptions, provide a rich set of mechanisms and structures through which the verticals can perform their intended tasks, whether the verticals are general purpose verticals intended to handle a class of incidents, or custom verticals intended to handle application- or class-specific incidents. While the precise interfaces are not relevant to the present invention, the following description is provided to illustrate an exemplary set of interfaces that is not intended to be complete, nor limiting, but rather provides details about exemplary interfaces that could be made available through the infrastructure 220, as contemplated by one embodiment of the present invention.

One type of interface contemplated by one embodiment of the present invention can be used by verticals to collect information, create a report, and transmit the report. For example, an interface, exemplarily called "WerReportCreate" in Table 1, below, can be used to cerate a report about an incident for transmission. More specifically, the interface can create a report object, which can be populated with all the information about a report as required by the platform in order to complete the reporting process.

TABLE 1

WerReportCreate API

Application Program Interface (API)

HRESULT WerReportCreate(
    IN PCWSTR pwzEventName
    OUT HREPORT *pReportHandle)

Parameters

| Parameter | Description |
| --- | --- |
| pwzEventName | Event name. This name must be registered on the server else the report will be ignored. |
| pReportHandle | This will contain the report handle. This is returned as NULL if any errors occur. |

Return Values

| Value | Description |
| --- | --- |
| S_OK | Success |
| E_INVALIDARG | Invalid event name |
| E_OUTOFMEMORY | Out of memory |
| E_PERMISSIONDENIED | Cannot create report if policy controlling WER is 0 (Error Reporting Disabled) |

Another interface that can be used by verticals is illustrated in Table 2, below. The interface, exemplarily entitled "WerReportSetOptions", can be used to set report options.

TABLE 2

WerReportSetOptions API

Application Program Interface (API)

HRESULT WerReportSetOptions(
    IN HREPORT ReportHandle
    IN PWER_REPORT_OPTIONS pReportOptions)

Parameters

| Parameter | Description |
| --- | --- |
| hReportHandle | The report handle returned from a successful call to WerReportCreate. |
| pReportOptions | Pointer to a populated report options structure. |

Return Values

| Value | Description |
| --- | --- |
| S_OK | Success |
| E_INVALIDARG | Invalid structure field or report handle. |
| E_OUTOFMEMORY | Out of memory |

The report options can be specified in a predefined structure, such as that illustrated in Table 3 below.

TABLE 3

Report Options Structure

Structure

```
typedef struct _WER_REPORT_OPTIONS
{
    DWORD       dwSize;
    HANDLE      hProcess;
    WCHAR       wzVerticalName[80];
    WCHAR       wzApplicationPath[MAX_PATH];
    WCHAR       wzApplicationName[MAX_PATH];
```

TABLE 3-continued

Report Options Structure

```
    WER_REPORT_TYPE       repType;
    DWORD                 dwFlags;
} WER_REPORT_OPTIONS, *PWER_REPORT_OPTIONS;
```

Fields

| Field | Description |
| --- | --- |
| dwSize | The size of this structure. |
| hProcess | Handle of the process that the report is regarding.<br>OPTIONAL: If passed as NULL, WER will use the calling process context. |
| wzVerticalName | Name of the vertical. This is used to lookup the consent settings in the registry. If null, the vertical name defaults to pwzEventName.<br>OPTIONAL: Can be passed as empty if vertical does not have specific registry settings. |
| wzApplicationPath | Full path to the application. For crashes and hangs this will be the name of the crashing, hanging application. For generic reports this will be the name of the application that is creating it.<br>OPTIONAL: WER will attempt to discover this if it is passed as empty. |
| wzApplicationName | Identifies the application by a "friendly" name. If null the application name is pulled from the executable's metadata.<br>OPTIONAL: WER will attempt to discover this if it is passed as empty. |
| repType | Identifies the type of the report:<br>WerReportCritical - Crashes, hangs will be critical errors. These event types will be archived. By default these processes will be terminated or restarted.<br>WerReportNonCritical - Other errors, these may not be archived. These processes are not terminated or restarted. |
| dwFlags | Combination of one or more of the following flags:<br>WER_REPORT_HONOR_RECOVERY - Honor any recovery registration for the application.<br>WER_REPORT_HONOR_RESTART - Honor any restart registration for the application.<br>WER_REPORT_QUEUE - This will force reports to be queued. This flag is ignored if repType is set to WerReportNonCritical as all non-critical reports are queued. |
| wzDescription | [Optional] A short 2-3 sentence description (512 characters) of the problem. This description is displayed in the report details. |

Another interface that can be provided to verticals can be an interface for setting the reporting signature. Table 4, below, illustrates such an interface, exemplarily entitled "WerReportSetParameter". A reporting signature can be the collection of parameters that will uniquely identify a particular event, wherein a separate call can be made for each parameter. Examples of such parameters contemplated by an embodiment of the present invention comprise the application's name, the application's version information, and like parameters. A verification to ensure that the report signature is valid can be made when the report is submitted.

TABLE 4

WerReportSetParameter API

ApplicationProgram Interface (API)

```
HERSULT WerReportSetParameter(
    IN HREPORT hReportHandle
    IN WER_PARAM ID
    IN PCWSTR pwzName
    IN PCWSTR pwzValue)
```

TABLE 4-continued

WerReportSetParameter API

Parameters

| Parameter | Description |
| --- | --- |
| hReportHandle | The report handle returned from WerReportCreate |
| ID | This represents the parameter enumeration which we are setting. Values will be WerP0, WerP1, etc. Parameters need not be specified in order. |
| pwzName | Optional name of the parameter. This can be NULL, in these cases Px will be used where x is the index of the parameter. |
| pwzValue | This will be the value of the parameter that we are setting |

Return Values

| Value | Description |
| --- | --- |
| S_OK | Success |
| E_OUTOFMEMORY | Out of memory error while adding the parameter |
| E_INVALIDARG | Bad parameter ID or NULL Param Value |
| E_HANDLE | Bad Report Handle |

TABLE 4-continued

WerReportSetParameter API

| | |
|---|---|
| WER_E_LENGTH_EXCEEDED | Length exceeded. Adding the parameter will cause the parameter data storage to overflow and it may be trimmed. |
| E_FAIL | Some unexpected error occurred |

As described above, custom verticals can be created to address incidents that may be specific to a particular application or class of applications. In some circumstances, those incidents may require that the application's support personnel be able to review one or more files that are associated with the incident. Therefore, another interface contemplated by embodiments of the present invention enables a vertical to attach one or more files to its report. One such interface, illustratively entitled "WerReportAddFile" is specified in Table 5 below.

TABLE 5

WerReportAddFile API

Application Program Interface (API)

HRESULT WerReportAddFile(
    IN HREPORT hReportHandle
    IN PCWSTR pwzPath
    IN WER_FILE_TYPE repFileType
    IN DWORD dwFileFlags)

Parameters

| Parameter | Description |
|---|---|
| hReportHandle | The report handle returned from WerReportCreate |
| pwzPath | Complete path to the file that needs to be added. The path can contain environment variables. |
| repFileType | This is used to describe the contents of the file being added. This can be one of WerFileTypeMinidump - Minidump file WerFileTypeHeapdump - Heap dump file WerFileTypeUserDocument - Contents of some user document like a .doc file WerFileTypeOther - File that fall under this category will be uploaded whenever a 2$^{nd}$ Level data request is made |
| dwFileFlags | This is used to define what action should be taken for the file once it is added to the report: WER_DELETE_FILE_WHEN_DONE WER_ANONYMOUS_DATA Denotes that this is "safe 2$^{nd}$ level" data |

Return Values

| Value | Description |
|---|---|
| S_OK | Success |
| E_OUTOFMEMORY | Out of memory error while adding the parameter |
| E_FAIL | Some unexpected error occurred |
| E_FILENOTFOUND | Invalid path to file |
| E_ACCESSDENIED | File cannot be read |
| E_HANDLE | Invalid report handle |

Rather than adding an entire file to a report, a vertical can, as indicated above, add a dump of memory to a report. A dump of memory, as will be known by those skilled in the art, is a collection of information, read from memory, that is comprised of data, such as heap data or stack data, that is not normally saved and that remains in a constant state of flux during the normal operation of an application program. An interface, exemplarily entitled "WerReportSetMiniDump" in Table 6, below, can enable a vertical to add a dump to a report and set the options and flags for the generation of that dump.

TABLE 6

WerReportSetMiniDump API

Application Program Interface (API)

HRESULT WerReportSetMiniDump(
    IN HREPORT hReportHandle
    IN DWORD dwDumpFlavor
    IN HANDLE hProcess
    IN PEXCEPTION_CUSTOM_OPTIONS pDumpCustomOptions
    IN BOOL bCollectAlways)

Parameters

| Parameter | Description |
|---|---|
| hReportHandle | The report handle returned from WerReportCreate. |
| dwDumpFlavor | One of the following: Microdump Minidump Fulldump (aka heap) Custom |
| hProcess | Handle to the process for which the information is to be generated. This handle must have read and query access |
| pDumpCustomOptions | This can be used to customize any minidump that will be collected. If the value of this parameter is NULL, then a standard minidump is collected. |
| bCollectAlways | If TRUE always collects this dump. If FALSE collects only if the server requests the dump. Default value is FALSE. |

Return Values

| Value | Description |
|---|---|
| S_OK | Success |
| E_FAIL | Some unexpected error occurred |
| E_HANDLE | Invalid Report Handle |
| E_INVALIDARG | Invalid argument |

The options and flags for the generation of the dump, requested using an interface such as that described in Table 6 above, can be specified using a structure such as that custom options structure specified in Table 7, below.

TABLE 7

Custom Options Structure

Structure

```
typedef struct _EXCEPTION_CUSTOM_OPTIONS
{
  DWORD       dwSize;
  DWORD       dwMask;
  DWORD       dwMinidumpType;
  BOOL        bDisableHeap;
  PMINIDUMP_EXCEPTION_INFORMATION    pExceptionParam,
  BOOL        bOnlyThisThread;
  DWORD       dwExceptionThreadFlags;
  DWORD       dwOtherThreadFlags;
  DWORD       dwExceptionThreadExFlags;
  DWORD       dwOtherThreadExFlags;
  DWORD       dwPreferredModuleFlags;
  DWORD       dwOtherModuleFlags;
  WCHAR       wzPreferredModuleList[WER_MAX_MODULES];
} EXCEPTION_CUSTOM_OPTIONS, PEXCEPTION_CUSTOM_OPTIONS;
```

Fields

| Field | Description |
|---|---|
| dwSize | The size of this structure. |
| dwMask | Bit mask to control which options are valid in the structure. |
| dwMinidumpType | The type of the minidump. This is an ORing of MINIDUMP_TYPE |
| bDisableHeap | Do not collect heap. |
| pExceptionParam | Pointer to a MINIDUMP_EXCEPTION_INFORMATION structure describing the client exception that caused the minidump to be generated. If this parameter is NULL (default), no exception information is included in the minidump file. |
| bOnlyThisThread | Whether the dump has to be collected only for this thread |
| dwExceptionThreadFlags | The flags for the thread that encountered the exception |
| dwExceptionThreadExFlags | Extra dump flags for the thread encountering the exception |
| dwOtherThreadFlags | Thread flags for threads other than the thread encountering the exception |
| dwOtherThreadExFlags | Extra dump flags for the any other thread (threads that did not encounter the exception) |
| dwPreferredModuleFlags | Module Flags for the crashing application, crashing module or any modules present in wzExtraModuleList |
| dwOtherModuleFlags | Module flags for other modules |
| wzPreferredModuleList | List of modules for which we want to customize dump generation. The dwPreferredModuleFlags will apply to these as well. Each name must be NULL terminated with the list being double NULL terminated. |

Once a vertical has created a report, such as by using the above described exemplary interfaces, it can request that the report be sent by using an interface, such as the exemplarily entitled "Wer ReportSubmit" interface described in detail in Table 8, below. Such an interface can initiate the sending of the report, and can return when the report has been inserted into a queue.

TABLE 8

WerReportSubmit API

Application Program Interface (API)

```
HRESULT WerReportSubmit(IN HREPORT hReportHandle
    IN DWORD dwConsentResult
    OUT PWER_SUBMIT
    SUCCESSCODE pSubmitCode)
```

TABLE 8-continued

WerReportSubmit API

Parameters

| Parameter | Description |
|---|---|
| hReportHandle | The report handle returned from WerReportCreate. |
| dwConsentResult | This indicates that prior to report being submitted, the caller has already attempted to get $1^{st}$ level consent from the user and gotten back the specified consent result. This consent must include permission to send $1^{st}$ level parameters and caller specified files. One of: WerConsentNotAsked Indicates the caller did not obtain consent resulting in the normal consent evaluation and experience. WerConsentAskedDenied Indicates the caller attempted to obtain consent |

TABLE 8-continued

WerReportSubmit API

| | |
|---|---|
| | the user denied the request.<br>WerConsentAskedApproved<br>Indicates the caller attempted to obtain consent, and the user agreed to sending 1$^{st}$ level data and the current contents of the CAB.<br>WerConsentAskedShowConsentDialog<br>Indicates the caller obtained interest from the user for sending a report but not consent. The consent dialog will appear to obtain consent provided the current settings don't allow the report to be sent automatically. |
| pSubmitSuccessCode | The extended success code. One of:<br>WerReportQueued<br>WerReportResultUploaded<br>WerRestart<br>WerClose<br>WerDebug<br>WerReportFailed |

Return Values

| Value | Description |
|---|---|
| S_OK | Success |
| E_OUTOFMEMORY | Out of memory error while submitting the report |

Once the vertical has completed collecting information for the report, and sending the report, it can end and clear any memory it may have used. An interface, such as the interface described in Table 9, below, illustratively entitled "WerReportCloseHandle" can be used to close the report handle, terminate error reporting and free any memory associated with the report.

TABLE 9

WerReportCloseHandle API

Application Program Interface (API)

HRESULT WerReportCloseHandle(
    IN HREPORT hReportHandle)

Parameters

| Parameter | Description |
|---|---|
| hReportHandle | The report handle returned from WerReportCreate. |

Return Values

| Value | Description |
|---|---|
| S_OK | Success |
| E_FAIL | Some unexpected error occurred |
| E_HANDLE | Invalid Report Handle |

In addition to providing interfaces for verticals to perform various reporting functions, the infrastructure 220 can also provide interfaces by which those verticals register for callbacks, such as can be used for document recovery, in a manner to be described in detail below. For example, one type of callback interface can enable a vertical to register to be made aware of any attempt to recover the user's work after the incident that resulted in the vertical preparing a report in the first place. Such a callback can provide the vertical with the opportunity to, for example, prevent the recovery if it would conflict with the vertical or otherwise produce undesirable results, prepare for document recovery, or even handle the document recovery itself. One such callback, illustratively entitled "WerReportSetReadyForDocumentRecoveryCallback" is described in greater detail in Table 10 below.

TABLE 10

WerReportSetReadyForDocumentRecoveryCallback

Application Program Interface (API)

HRESULT WerReportSetReadyForDocumentRecoveryCallback(
    IN HREPORT hReportHandle
    IN
    DR_CALLBACK_ROUTINE ReadyForDocumentRecoveryRoutine)

Parameters

| Parameter | Description |
|---|---|
| hReportHandle | The report handle returned from WerReportCreate. |
| ReadyForDocumentRecovery Routine | "DWORD ReadyForDocumentRecoveryRoutine( )"<br>Returned DWORD:<br>0 - Preparations done, WER can continue with recovery.<br>1 - Do not attempt document recovery (cancel).<br>2 - Document recovery handled without problem.<br>3 - Document recovery handled, but problems were encountered. |

In addition to providing interfaces for verticals to perform various reporting functions, and receive various callbacks, the infrastructure 220 can also provide interfaces by which applications can register for various options and features to be implemented when a vertical, irrespective of exactly which vertical it may be, handles any of the incidents that may affect that application. For example, one such interface can provide a mechanism by which an application can register for some form of recovery. If an application had called this interface during its lifetime and it crashes, hangs or encounters any other fatal event that can be handled by a general purpose vertical, it can be called at the appropriate time to allow for data recovery. Generally, the actual recovery would be handled by the application itself. Table 11, below, provides further details of one such interface, exemplarily entitled "RegsiterSetRecovery".

TABLE 11

RegisterSetRecovery API

Application Program Interface (API)

HRESULT RegisterSetRecovery(
    IN RECOVERY_ROUTINE RecoveryRoutine
    IN PVOID pvParameter)

Parameters

| Parameter | Description |
|---|---|
| RecoveryRoutine | The function to call to do the actual document recovery.<br>"DWORD RecoveryRoutine(LPVOID lpParam)" |
| pvParameter | Any parameter to be passed to the function |

Return Values

| Value | Description |
|---|---|
| S_OK | Success |
| E_FAIL | Some unexpected error occurred |

After a recovery is initiated via a call to an appropriate routine of the application, another interface can provide a mechanism by which the application can indicate that it is still "alive" and continuing to recover user data. Such an interface can be required to be called on a predefined interval in order to provide a mechanism by which external processes can determine if the application has failed in its recovery attempt and has ceased proper operation. In such a case, external processes can assume that the application is unable to continue recovery and can terminate it. One such interface, illustratively entitled "RecoveryInProgress" is described in greater detail in Table 12 below.

TABLE 12

RecoveryInProgress API

Application Program Interface (API)

HRESULT RecoveryInProgress( )

Return Values

| Value | Description |
|---|---|
| S_OK | Success |
| E_FAIL | Some unexpected error occurred |
| E_CANCEL | User canceled the recovery process |

In an analogous fashion to the interface that can be called to inform external processes that a recovery attempt is continuing, the application can also explicitly indicate, via an interface call, that it has completed recovery. Table 13, below, illustrates one such interface, exemplarily entitled "RecoveryFinished".

TABLE 13

RecoveryFinished API

Application Program Interface (API)

HRESULT RecoveryFinished( )

Parameters

| Parameter | Description |
|---|---|
| bSuccess | Indicates whether the document was recovered |

Another type of interface that an application can use is an interface by which the application can register to be automatically restarted after the incident and after the vertical used to report the incident has completed its information gathering. An exemplary version of such an interface, illustratively entitled "RegisterSetRestart", is shown in Table 14 below.

TABLE 14

RegisterSetRestart API

Application Program Interface (API)

RegisterSetRestart( )

Parameters

| Parameter | Description |
|---|---|
| pwzCommandline | Command line passed to the application when we restart it. The maximum size of the command line is 4K. The command line should not include the name |

TABLE 14-continued

RegisterSetRestart API of the exe, as the infrastructure will always prepend it. For example if you are notepad.exe and want to register for aa.txt call this API only with L"aa.txt" and not "notepad.exe aa.txt".

Return Values

| Value | Description |
|---|---|
| S_OK | Success |
| E_FAIL | Some unexpected error occurred |

As described above, applications can also register for verticals, including general purpose verticals and custom verticals, to include specific information in the reports that the verticals prepare. For example, specific aspects of the vertical's reporting can be addressed via flags that an application can set via an interface such as that shown in Table 15 below, and illustratively entitled "WerRegisterSetConfigurationFlags".

TABLE 15

WerRegisterSetConfigurationFlags API

Application Program Interface (API)

HRESULT WerRegisterSetConfigurationFlags(
    IN DWORD dwFlags)

Parameters

| Parameter | Description |
|---|---|
| dwFlags | One of:<br>WER_MASK_NO_HEAP - Do not collect heap from this process in the event of a crash or hang. |

Return Values

| Value | Description |
|---|---|
| S_OK | Success |
| E_FAIL | Some unexpected error occurred |
| E_OUTOFMEMORY | Insufficient size of command line buffer to receive the get |

Another interface, contemplated by embodiments of the present invention, can be used to both register and un-register files to be added to a report. For example, Table 16, below, illustrates an interface, exemplarily entitled "WerRegisterAddFile", which can enable an application to register that a file be added to any report transmitted by a vertical.

TABLE 16

WerRegisterAddFile API

Application Program Interface (API)

HRESULT WerRegisterAddFile(
    IN PCWSTR pwzFile
    IN REPORT_FILE_TYPE repFileType
    IN DWORD dwFileFlags
    IN OUT PDWORD pdwFileID)

TABLE 16-continued

WerRegisterAddFile API

Parameters

| Parameter | Description |
|---|---|
| pwzFile | Complete path of the file to be added. |
| repFileType | This is used to describe the contents of the file being added. This can be one of<br>WerFileTypeMinidump- Minidump file<br>WerFileTypeHeapdump - Heap dump file<br>WerFileTypeUserDocument - Contents of some user document like a .doc file<br>WerFileTypeOther - Any other type of file |
| dwFileFlags | This is used to define what action should be taken for the file once it is added to the report<br>WER_DELETE_FILE_WHEN_DONE<br>WER_ANONYMOUS_DATA<br>Denotes that this is "safe $2^{nd}$ level" data |
| pdwFileID | Pointer to a variable that for the ID. This variable should initially contain WER_INVALID_ID. On successful return that variable will contain the ID of the registered file. |

Return Values

| Value | Description |
|---|---|
| S_OK | Success |
| E_FAIL | Some unexpected error occurred |
| E_INVALIDARG | Invalid arguments were passed. |
| E_OUTOFMEMORY | No memory is available. |

Similarly, an interface can be provided to enable applications to register memory blocks or areas to be attached to any report that a vertical creates. One such interface, exemplarily entitled "WerRegisterAddMemoryBlock", is further detailed in Table 17 below.

TABLE 17

WerRegisterAddMemoryBlock API

Application Program Interface (API)

HRESULT WerRegisterAddMemoryBlock(
　IN PVOID pvAddress
　IN DWORD dwSize
　IN OUT PDWORD pdwMemID)

Parameters

| Parameter | Description |
|---|---|
| pvAddress | The address of the memory block |
| dwSize | The size of the memory block. This can be a max of WER_MAX_MEM_BLOCK as defined in werapi.h, which is currently defined as 256 KB. |
| pdwMemID | Pointer to a variable that for the ID. This varialble should initially contain WER_INVALID_ID. On successful return that variable will contain the ID of the registered memory block. |

Return Values

| Value | Description |
|---|---|
| S_OK | Success |
| E_OUTOFMEMORY | Out of memory |

As can be seen, the infrastructure 220, as contemplated by one embodiment of the present invention, can provide access to a number of mechanisms and underlying support systems to enable verticals and applications to collect information regarding various incidents and access other attendant alternatives. To illustrate one exemplary use of these interfaces, a flow diagram describing the operations performed by verticals according to one embodiment of the present invention is shown in FIGS. 4a and 4b.

Figure 4A:
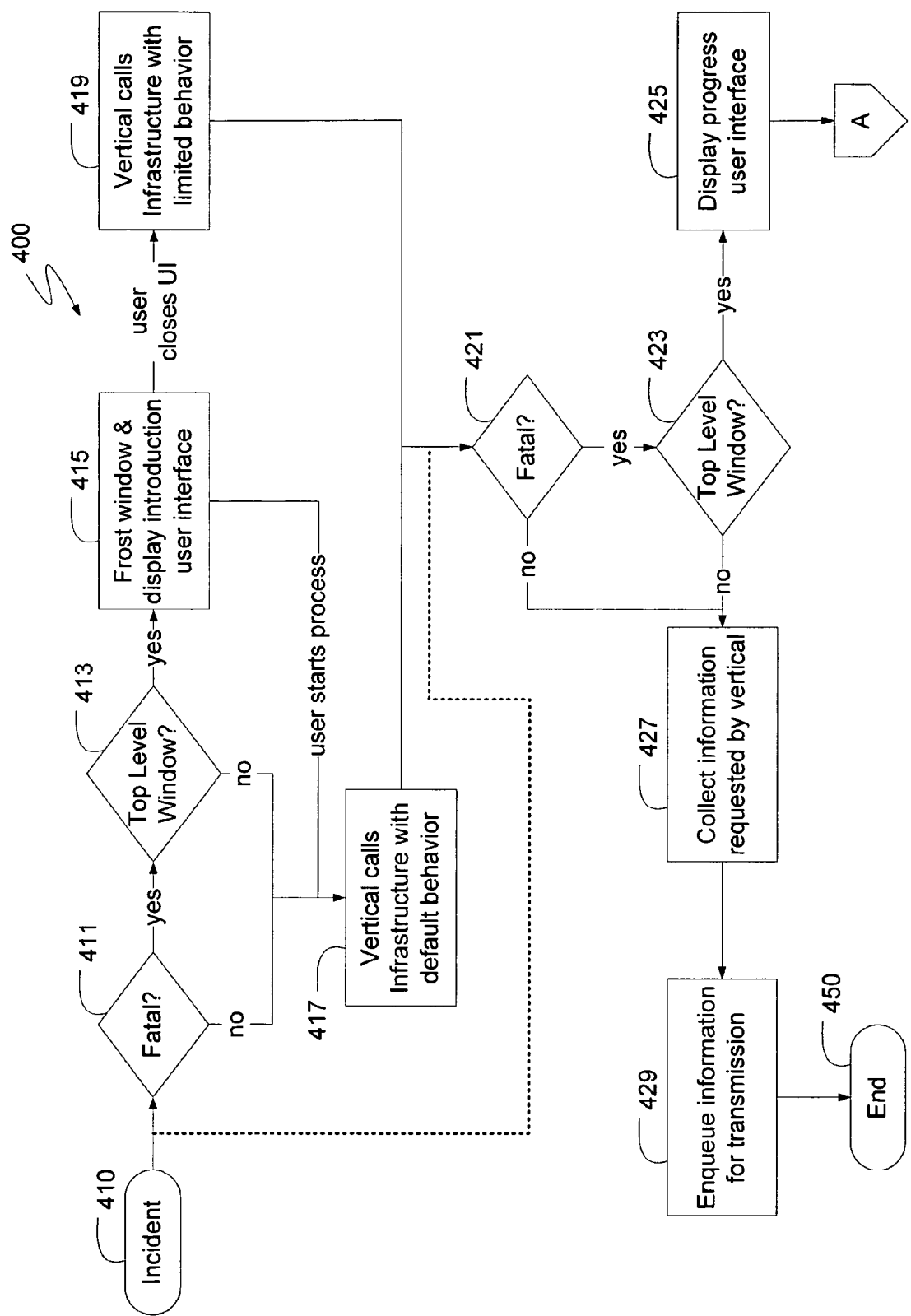
FIGS. 4a-b generally illustrates a more detailed operational flow contemplated by embodiments of the present invention.
Figure 4B:
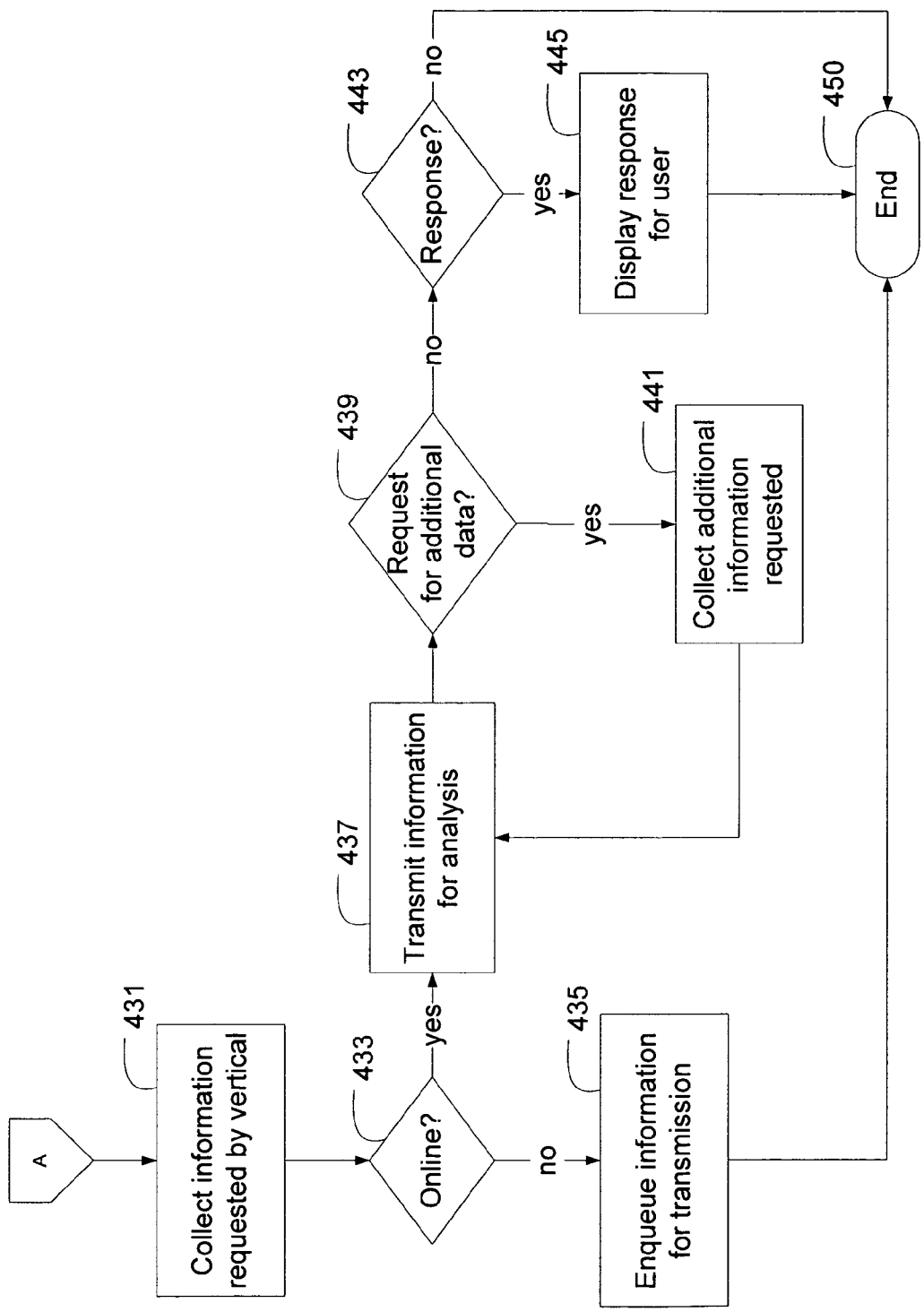

Turning to FIG. 4a, an initiating incident can occur at step 410, as shown. In one alternative, contemplated by an embodiment of the present invention, if the incident at step 410 was a hang incident, a determination of whether the incident was "fatal" can be made at step 411. If the incident at step 410 was a non-hang incident, then steps 411-419 could be bypassed, as will be described in further detail below, and the first step after the non-hang incident at step 410 would be the determination of whether the incident was fatal at step 421. In another alternative, contemplated by an embodiment of the present invention, steps 411-419 can be performed irrespective of whether the incident at step 410 was a hang incident or a non-hang incident. In such a case, all incidents can trigger an evaluation, at step 411, of whether the incident was fatal. As described in detail above, a "fatal" incident can be one in which the application having the incident ceases to operate properly and cannot be relied upon to execute future instructions properly without being restarted. If at step 411 it is determined that the incident is not fatal, an appropriate vertical can use the infrastructure described above to create a default report at step 417. However, if at step 411 it is determined that the incident is fatal, then a subsequent determination at step 413 can determine if the application experiencing the incident currently posses the top level window if the application is being run in a windowing operating system. If the application experiencing the incident does not currently possess the top level window, then an appropriate vertical can use the infrastructure described above to create a default report at step 417.

However, if the application is determined to have the top level window at step 413, that window can be "frosted" at step 415 and a notification can be presented to the user indicating the incident and the anticipated vertical behavior in order to aid the user in better selecting an appropriate course of action. As will be known by those skilled in the art, the act of "frosting" a window comprises removing some of the color intensity of the window to visually indicate that the window corresponds to an application or process that is either operating in the background, or has ceased operation. Additionally, a frosted window enables a more recent window, such as the user notification of step 415, to be more noticeable to a user.

If the application experiencing the incident at step 410 is not being run in a windowing operating system, then a user interface analogous to that at step 415 can be presented to the user in whichever mechanisms such a non-windowing operating system allows for. Alternatively, the vertical could use the infrastructure described above to create a default report at step 417 without presenting any user notifications.

Because a user may be concerned about any information that might be transmitted without their consent, embodiments of the present invention contemplate a user interface which can convey to the user the nature of the information that will be collected and the potential benefits, including possible solutions to the incident, that the user may derive from allowing the vertical to send all of the information it collects. If the user closes the user interface, then the vertical can operate using a limited behavior, as shown at step 419. Such limited behavior may comprise a reduction in the amount of information collected, the type of information collected, or the feedback provided as a result of the information collection. However, if the user, in response to the notification provided at step 415, enables the vertical to operate fully, a default behavior can be used as shown at step 417.

In addition, embodiments of the present invention contemplate that the user's authorization to send information can be stored on a per-vertical basis. Thus, for example, if the user had authorized, via the user interface presented at step 415, the vertical to send all of the information it collected, that explicit authorization could be stored in such a manner that the particular vertical that was authorized would no longer need to request authorization to send an equivalent amount of information. Similarly, the user could have a default setting which a vertical could use if the user did not explicitly authorize the collection of a particular level of information. In such a case, the limited behavior of step 419 would be commensurate with the user's default authorization.

Initially, all verticals can have a default setting that requires the user to be prompted every time the vertical seeks to collect information. The user can be provided with the ability to select different default settings, including, for example, settings that enable the vertical to only send the report parameters, or all of the data collected, or only "safe" additional data. For example, the user interface presented at step 415 can serve as a mechanism by which the user can select a default setting for the vertical presenting the user interface. Alternatively, a common user interface can be presented at a time prior to the incident at step 410.

Irrespective of whether the vertical executes using a default behavior or a limited behavior, however, the user notification aspect of the vertical's operations can still be dependent upon whether the incident was a fatal incident, as shown at step 421 and whether the application experiencing the incident owned the top level window, as shown at step 423. While FIG. 4a illustrates steps 421 and 423 as independent of steps 411 and 413, one of skill in the art will recognize that only a single determination need be made for each of steps 411 and 421 and again for steps 413 and 423. Thus, for example, if an initial determination was made as to whether the incident was fatal at step 411, then step 425 or step 427 could be performed immediately after steps 417 or 419 because the system would already know whether the incident was fatal.

As indicated above, an alternative, contemplated by an embodiment of the present invention, skips steps 411-419 for incidents other than hang incidents. Thus, according to that alternative, after a non-hang incident at step 410, a determination could be made whether the incident was fatal at step 421 and whether it owned the top level window at step 423 without performing steps 411-419. In such a case, steps 421 and 423 would be the only determinations made of whether the incident was fatal and whether the application experiencing the incident owned the top level window, since steps 411 and 413 would not have been performed. As explained in detail above, a vertical may already have authorization from a user to collect information, such as through a previously presented user interface, or a default setting, and a user interface would not need to be presented. Consequently, steps 411-419 could be bypassed as indicated. Alternatively, the incident experienced at step 410 may not be of a type that necessitates the performance of steps 411-419. For example, if incident 410 was a hang incident there may be benefits to performing steps 411-419. However, if the incident 410 was an application-specific incident, such as the failure to load a plug-in, it could be very inconvenient for the user to have the application's window frosted as indicated by step 415. In such a case, the application could continue to operate after the incident 410, steps 411-419 could be bypassed, and subsequent steps, such as steps 421 and 423, could be performed in the background without affecting the user's ability to continue to use the application.

As shown in FIG. 4a, if the application experiencing the incident was being run in a windowing operating system and owned the top level window, and if the incident was fatal, then subsequent to either step 417 or step 419, a progress indicator can be displayed to the user, together with additional relevant information, as illustrated at step 425. However, if either the incident was non-fatal, or if the application experiencing the incident did not own the top level window, then the vertical need not display any user notifications, and can simply collect the information as illustrated in step 427. If the application experiencing the incident was not being run in a windowing operating system, then a user interface analogous to that at step 425 can be presented to the user in whichever mechanisms such a non-windowing operating system allows for. Alternatively, the vertical could simply collect information, as illustrated at step 427, without presenting any user notifications.

Once the information requested by the vertical has been collected, it can be enqueued for transmission at step 429, and the vertical can end at step 450, as shown. Those of skill in the art will recognize that steps 427 and 429 can be performed using the infrastructure 220 described in detail above. For example, step 427 can comprise invoking one or more interfaces such as the WerReportCreate, WerReportSetParameter, or WerReportAddFile interfaces described in detail above, while step 429 can comprise using an interface such as the WerReportSubmit interface also described in detail above.

If, however, a progress user interface, or some other user notification, was presented at step 425, then, continuing to FIG. 4b, the vertical can collect information to prepare a report at step 431. As above, with step 427, step 431 can comprise invoking one or more interfaces such as the WerReportCreate, WerReportSetParameter, or WerReportAddFile interfaces, which were previously described in detail. After collecting the information for the report to be submitted by the vertical, a check can be made at step 433 to determine if the host computing device is online. As will be recognized by those skilled in the art, the term "online" refers only to the existence of connectivity between the host computing device and whatever computing device is the destination for the vertical's report, and is not intended to signify the use of any particular network or protocol.

If the computing device is not currently online, then the information collected by the vertical can be enqueued for transmission at step 435 in a matter analogous to that described above with respect to step 429. However, if the host computing device is online, then one embodiment of the present invention contemplates a user feedback mechanism by which the information gathered by the vertical may be able to present the user with a solution to the incident immediately. Additionally, another embodiment of the present invention contemplates that the infrastructure can receive real time requests for additional information that may be deemed to be particularly relevant given the information already collected.

Therefore, as shown in FIG. 4b, if the host computing device is currently online, then the information collected by the vertical can be transmitted for analysis at step 437. At step 439, the infrastructure may receive a request for additional data. Additionally, as described in detail above, the vertical can register for a callback, such as the WerReportSetAdditionalDataCallback described in detail above, such that if additional information is requested after the vertical has already completed gathering information and submitting its report, it can be made aware of the request. The ability to request the collection of additional information can be especially useful for developers and application support personnel if the information commonly collected by a vertical identifies the incident as one of a handful of possibilities, but additional information, not collected by the vertical by default, is required to precisely identify the cause of the incident.

As shown in FIG. 4b, if a request for additional data is received at step 439, the infrastructure can collect the additional information requested at step 441 and submit a subsequent report at step 437. As will be recognized by those skilled in the art, the additional data can be collected in much the same manner as the preparation of the original report. Specifically, rather than responding to a vertical's requests, such as via the APIs described in detail above, the infrastructure 220 can utilize the routines exposed via those APIs to collect the requested information itself. Additionally, as illustrated by the loop comprising steps 437, 439 and 441, there can exist multiple requests for additional data. For example, if the additional data requested may be large, it may be more efficient to request only a subset initially, especially if that subset may rule out a particular analysis that would have required significantly more data collection.

If there are no requests for additional data at step 439, or no further requests, the infrastructure may receive a response that provides the user with additional information regarding the incident. For example, if the incident is a known or common incident, the user can be provided with information regarding its cause and possible solutions. Alternatively, the user may be informed that an updated version of the application that experienced the incident is available that no longer shares the same issue. If the incident is one that has not yet been solved by the application's support personnel, then the user may be presented with generalized information regarding possible causes or possible preventative steps that the user can take. The infrastructure can receive the response for the user in much the same manner as it receives the requests for additional data.

The infrastructure can display any responses to the user at step 445, as shown in FIG. 4b. Such responses can provide the user with information that can reduce or eliminate future occurrences of the incident at step 410. For example, if the incident was caused by a known problem that may have been corrected in a newer version of the application experiencing the incident, the user can be informed of the availably of the newer version. Similarly, if the incident was caused by a known problem what was corrected by additional computer-readable instructions commonly referred to as a "patch" the user can be presented with a location from which the user can download the patch and install it. For those users who wish to minimize their efforts, an option can be provided by which such patches are automatically downloaded and installed. Alternatively, if the cause of the incident at step 410 is unknown, then the user can be presented with a series of suggestions that may be generally helpful when dealing with incidents similar to the incident at step 410. Once the user has been presented with any responses that may have been received, the process can end, such as in step 450, and the vertical it can signal its completion to other processes, so that the memory used by the vertical can be released, and, if the application experienced a fatal incident, the application can be restarted. One such interface that can be used by the vertical to end properly can be the WerReportCloseHandle interface described in detail above.

As can be seen, the infrastructure 220 can provide mechanisms by which general purpose verticals, such as the Crash Vertical 211 or the Hang Vertical 213, can be created to collect information regarding specific incident types and transmit that information to application support personnel so that a solution may be found. In addition, the infrastructure can be used to create custom verticals, such as custom vertical 215, that can be used to collect information for a specific incident. Applications can request the verticals to collect additional information and can request to be notified when the vertical has completed in order to attempt to recover from the incident. Once a vertical has sent the information it has collected, the infrastructure may receive a request for additional information, to which it can similarly respond, or it can receive feedback that can be presented to the user.

In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that some elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A computer-readable medium having computer-executable instructions for collecting information in response to an incident, the computer-executable instructions performing steps comprising: registering for a specific incident or an incident type; receiving a notification of an occurred incident, wherein the occurred incident is either the registered specific incident or is of the registered incident type; collecting a predetermined set of information associated with the incident; and transmitting the collected predetermined set of information for analysis.

2. The computer-readable medium of claim 1 having further computer-executable instructions for performing steps comprising: collecting a requested set of information, wherein the requested set of information was requested by an application associated with the incident; and transmitting the collected requested set of information for analysis.

3. The computer-readable medium of claim 1 having further computer-executable instructions for performing steps comprising: receiving feedback in response to the transmitting the collected predetermined set of information, wherein the feedback is related to an analysis of the collected predetermined set of information.

4. The computer-readable medium of claim 3, wherein the feedback comprises information for the user regarding the incident, the computer-readable medium having further computer-executable instructions for performing steps comprising: displaying the feedback to the user.

5. The computer-readable medium of claim 3, wherein the feedback comprises a request for additional information, the computer-readable medium having further computer-executable instructions for performing steps comprising: collecting the requested additional information; and transmitting the collected requested additional information for further analysis.

6. The computer-readable medium of claim 1, wherein the transmitting the collected predetermined set of information comprises enqueuing the collected predetermined set of information for subsequent transmission if there is no access to a transmitting destination, if the occurred incident is non-fatal, or if the occurred incident is associated with an application that does not control a top level window.

7. The computer-readable medium of claim 1, wherein the receiving the notification of the occurred incident comprises receiving the notification from an operating system unhandled exception filter, and wherein the registering for the specific incident or the incident type comprises registering for a crash type incident.

8. The computer-readable medium of claim 1 having further computer-executable instructions for performing steps comprising: collecting a further set of information in accordance with a user's explicit or default authorization.

9. A computer-readable medium having computer-executable instructions for supporting the collection of information in response to an incident, the computer-executable instructions performing steps comprising: receiving a request to create a report object, the report object being associated with an event name; providing a handle to the report object, the report object having been created in response to the request to create the report object; receiving a request to set a parameter of the report object comprising the handle of the report object; receiving a request to submit the report object comprising the handle of the report object and an indication of a user's consent to the submission; and providing an indication of the success of a transmission of the report object, the transmission occurring in response to the request to submit the report object.

10. The computer-readable medium of claim 9 having further computer-executable instructions performing steps comprising: receiving a request to add a file to the report object comprising the handle of the report object and an identifier of the file.

11. The computer-readable medium of claim 9 having further computer-executable instructions performing steps comprising: receiving a request to add a dump of a section of memory to the report object comprising the handle of the report object and an identifier of the section of memory.

12. The computer-readable medium of claim 9 having further computer-executable instructions performing steps comprising: receiving a request to register a callback mechanism for responding to a request for additional data comprising the handle of the report object and an identification of a function to call if the request for additional data is received in response to the transmission of the report object.

13. The computer-readable medium of claim 9 having further computer-executable instructions performing steps comprising: receiving a request to register a recovery callback mechanism comprising the handle of the report object and an identification of a function to call if a request for recovery of data is made by an application experiencing the incident.

14. An operating system for a computing device, the operating system comprising an incidental feedback platform for providing feedback in response to incidents, the incidental feedback platform comprising: an interface for registering a vertical, wherein the vertical comprises computer-executable instructions for collecting information in response to incidents; an interface for creating a report in response to incidents; an interface for editing the report; an interface for transmitting the report; and one or more general purpose verticals comprising computer-executable instructions for collecting a first predetermined set of information in response to application incidents.

15. The operating system of claim 14, wherein the incidental feedback platform further comprises an interface for adding a file to the report.

16. The operating system of claim 14, wherein the incidental feedback platform further comprises an interface for adding a dump of memory to the report.

17. The operating system of claim 14, wherein the one or more general purpose verticals further comprise computer-executable instructions for collecting a further set of information requested by an application experiencing an incident.

18. The operating system of claim 14, wherein the incidental feedback platform further comprises computer-executable instructions for responding to a request for additional data, the request for additional data being received in response to a transmission of the report.

19. The operating system of claim 14, wherein the incidental feedback platform further comprises an interface for providing analysis for display to a user, the analysis being based on the report.

20. The operating system of claim 14 further comprising a mechanism for storing a user's default authorization as to which information can be collected by the vertical.

* * * * *